(12) United States Patent
Roders

(10) Patent No.: US 7,201,548 B2
(45) Date of Patent: Apr. 10, 2007

(54) WEIGHT-COMPENSATING DEVICE

(75) Inventor: Jurgen Roders, Hamburg (DE)

(73) Assignee: P & L GmbH & Co. KG, Hamburg (DE)

( * ) Notice: Subject to any disclaimer, the term of this patent is extended or adjusted under 35 U.S.C. 154(b) by 351 days.

(21) Appl. No.: 10/513,504

(22) PCT Filed: May 7, 2003

(86) PCT No.: PCT/EP03/04796

§ 371 (c)(1),
(2), (4) Date: Nov. 5, 2004

(87) PCT Pub. No.: WO03/095143

PCT Pub. Date: Nov. 20, 2003

(65) Prior Publication Data

US 2005/0158134 A1    Jul. 21, 2005

(30) Foreign Application Priority Data

May 8, 2002    (DE) ............... 102 20 617

(51) Int. Cl.
*B23C 1/06*    (2006.01)
*B23Q 11/04*    (2006.01)

(52) U.S. Cl. .............. 409/237; 409/212; 408/235

(58) Field of Classification Search .............. 409/237, 409/235, 238–239, 141, 202, 212; 408/235, 408/234, 143; 82/903; 451/343
See application file for complete search history.

(56) References Cited

U.S. PATENT DOCUMENTS

| 3,327,571 | A | | 6/1967 | Sawada |
| 3,988,965 | A | * | 11/1976 | Cayen et al. ............... 409/237 |
| 4,358,888 | A | * | 11/1982 | Zankl et al. ................ 483/54 |
| 5,787,772 | A | * | 8/1998 | Weber et al. ................ 82/47 |
| 6,350,991 | B1 | * | 2/2002 | Ryding ................ 250/492.21 |
| 6,439,813 | B1 | * | 8/2002 | Repossini ............... 409/237 |

FOREIGN PATENT DOCUMENTS

| DE | 10038013 | 2/2002 |
| EP | 1047102 | 10/2000 |

* cited by examiner

*Primary Examiner*—Erica Cadugan
(74) *Attorney, Agent, or Firm*—Global IP Counselors, LLP

(57) ABSTRACT

The present invention relates to a weight compensating device comprising a carrier and a component which is supported on the carrier and is displaceable particularly in vertical direction by means of a drive, characterized in that the carrier and the component have arranged therebetween at least one negative pressure body of a variable length which is connected to a negative pressure source for compensating the weight acting on the component.

19 Claims, 1 Drawing Sheet

WEIGHT-COMPENSATING DEVICE

BACKGROUND OF THE INVENTION

1. Field of the Invention

The present invention relates to a weight compensating device comprising a carrier and a component which is supported on the carrier and is displaceable particularly in a vertical direction by means of a drive.

2. Background Information

Especially in the field of machine tools, components which are in part relatively heavy must be displaced and/or precisely held in vertical direction against their weight or against gravity.

Many mechanisms are already known wherein a weight compensating device is used for compensating at least part of the weight/gravity of the component and for relieving the drive at the same time. The solutions include, for instance, counterweights, which are e.g. held via a deflection pulley and a rope, or the like. Further mechanisms show hydraulic or pneumatic solutions.

The already known solutions are marked by the drawback that the sum of the masses to be moved will be increased considerably when a counterweight is used because the mass of the weight compensating device has to be added to the mass of the component.

The total mass which is increased on the whole entails serious problems with respect to the inertia of the component. For instance, it is not possible to move accelerations of more than 1 g because this will otherwise damage the weight compensating device or impair its functional reliability. In particular, cables or the like, used by the weight compensating device, cannot be held under tension for a long period of time.

Further problems are created by accelerations that arise and necessary decelerations.

In hydraulic and pneumatic solutions, additional friction is caused by the use of hydraulic cylinders or pneumatic cylinders during movement of the component. This additional friction must be compensated by the drive. Additional friction arises on account of the piston seals of such piston/cylinder arrangements.

Hence, the overall problem arises that, upon a directional reversal of the movement of the component, frictional forces have to be overcome that are quite considerable, and that large additional masses have to be accelerated and decelerated, respectively.

Especially in machine tools in which three-dimensional operating movements are to be created, this results in undesired flaws, e.g. so-called quadrant jumps in circles.

Further drawbacks arise with respect to the linear drives used in modern machine tools. Such linear drives/linear motors are only able to apply small holding forces so that a weight compensation as well as measures for the respective mounting are indispensable in the case of vertically movable components.

SUMMARY OF THE INVENTION

It is the object of the present invention to provide a weight compensating device of the above-mentioned type which with a simple construction and at low manufacturing costs allows for a weight compensation also in the case of a very dynamic movement of the component while avoiding the drawbacks of the prior art.

Accordingly, this object is achieved by providing a weight compensating device comprising: a carrier and a component having arranged thereinbetween at least one negative pressure body of a variable length which is connected to a negative pressure source for compensating the weight acting on the component.

The weight compensating device of the invention is characterized by a number of considerable advantages.

First of all, it should be noted that the solution of the invention creates virtually no friction so that even with very dynamic movements of the component, which is e.g. provided with linear drives, a high positioning accuracy can be accomplished. In machine tools this means a very high contour fidelity in the case of such very dynamic axial units or axes comprising the said component.

The negative pressure body of the invention is preferably configured in the form of a vacuum hose. One or several vacuum hoses of such a type may be mounted on the component such that they compensate part of the weight or the whole weight of the component.

Such vacuum hoses can be produced at very low costs. These are conventional standardized constructional elements. Vacuum hoses are e.g. known in connection with lifting and transportation in transport engineering. They can vary their length within wide ranges, and a collapsing of the vacuum hose due to the external air pressure is avoided by a spiral spring or the like, which is introduced into the wall of the vacuum hose to stabilize the vacuum hose. The vacuum prevailing in the vacuum hose thus acts in axial direction only.

Hence, the negative pressure body of the invention does not impair the movability or movement of the component, but just compensates the gravity or weight thereof. Hence, very rapid and highly dynamic movements are also possible and these effect a very high contour fidelity in the treatment of workpieces.

Preferably, the negative pressure source is connected via an accumulator to the negative pressure body. Since the negative pressure (the vacuum) in the negative pressure body cannot be reduced at will for technical reasons, the accumulator with its considerably enlarged volume forms a buffer. Preferably, the accumulator is connected to the negative pressure body via a line of a small cross-section, e.g. a small connection hose, which provides for permanent pressure compensation between the accumulator and the negative pressure body. Large changes in volume in the negative pressure body (vacuum hose) during movement of the component have thus only a slight effect on the overall pressure of the vacuum in the negative pressure body and the accumulator because there is a very large volume of the overall system on the whole. Hence, this volume is hardly changed by the compression or decompression of the negative pressure body.

A further essential advantage of the invention follows from the good thermal characteristics. Hence, the weight compensating device of the invention does not lead to an undesired heating up of specific parts of the total system, which in turn could limit the precision of the movement. Since only very small air masses are moved between the negative pressure body and the accumulator, the air is hardly heated up even in the case of a long-lasting, rapid and reversing movement of the component. The low friction of the negative pressure body (vacuum hose) is also instrumental in virtually preventing any heating up of the negative pressure volume, also in the case of very high loads.

These and other details, features and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawing which forms a part of the original disclosure.

DETAILED DESCRIPTION

Figure 1:
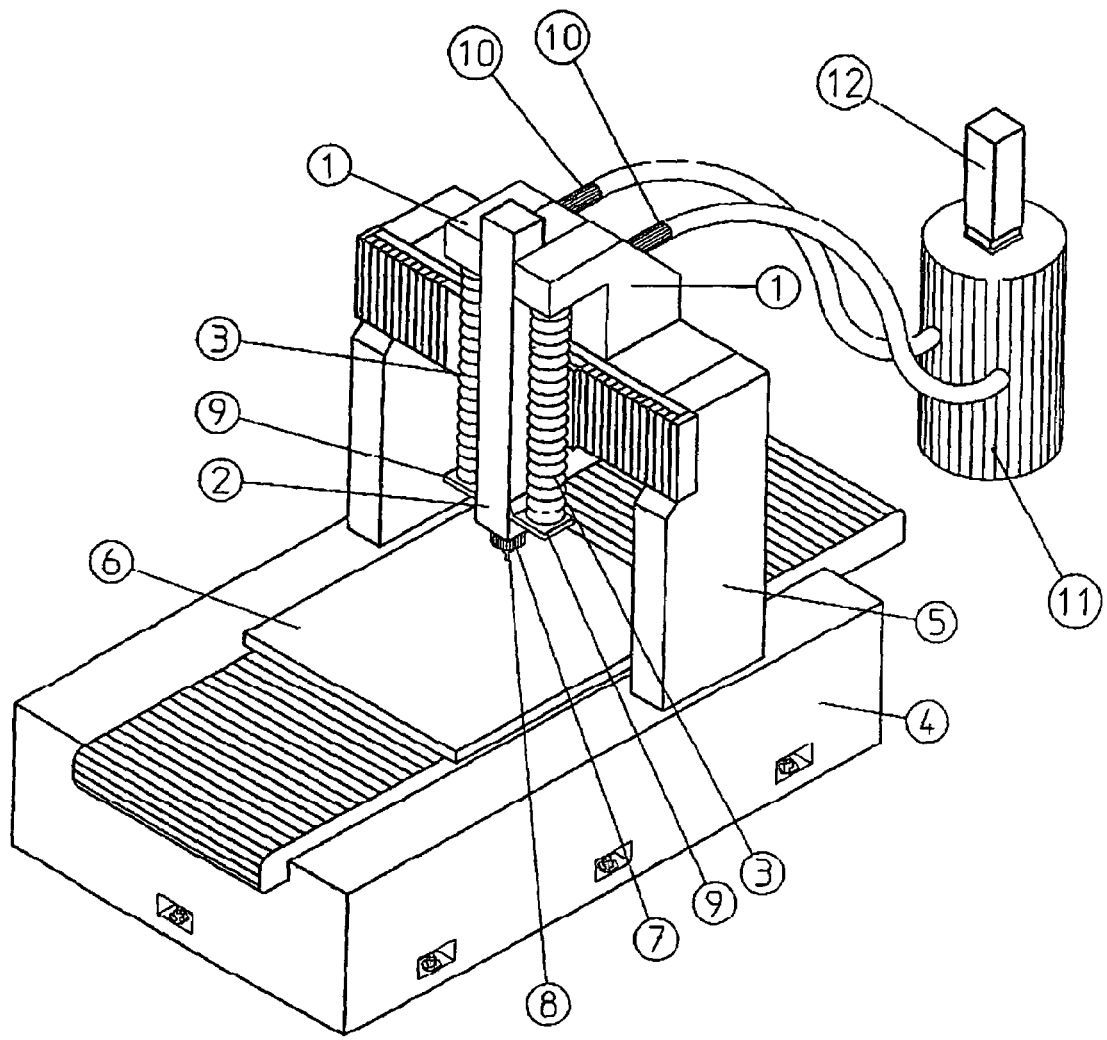
FIG. 1 is a simplified perspective view of a machine tool using the weight compensating device of the invention.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

FIG. 1 is a schematic perspective illustration showing a machine tool with a machine bed 4 on which a portal 5 is supported. The machine bed 4 has movably arranged thereon a table 6 which can carry a workpiece (not shown).

The portal 5 supports a carrier 1 which is laterally displaceable. The carrier 1, in turn, supports thereon a vertically movable component 2 which forms an axial unit with a spindle 7 and a tool 8. The respective drives are not shown in detail for the sake of a clear illustration. It follows from the resulting movement paths that the tool 8 is movable in at least three axes relative to a workpiece.

As mentioned, the axial unit (component 2) is movable in vertical direction relative to the carrier 1. It comprises lateral lower struts 9, each having fastened thereto a negative pressure body 3 (vacuum hose). The upper end of the negative pressure body 3 (vacuum hose) is fastened to the carrier 1. The introduction of a vacuum into the negative pressure body 3 is accomplished through connections 10 which may e.g. be configured in the form of hoses and are fastened to the carrier 1. The hoses have a small cross-section and lower ends that terminate in an accumulator 11 or tank. A drive or a vacuum pump 12 is coupled to the accumulator 11.

It follows from the illustration of FIG. 1 that the weight of the axial unit 2 can be compensated through a symmetrical arrangement of the two negative pressure bodies (vacuum hoses) 3.

The present invention is not limited to the illustrated embodiment. Rather, many alterations and modifications are possible within the scope of the present invention.

The invention claimed is:

1. A weight compensating device comprising:
a carrier and a component including a machining spindle which is supported on the carrier and is displaceable in at least a vertical direction relative to the carrier by a drive, the carrier and the component having arranged therebetween at least one negative pressure body of a variable length which is connected to a negative pressure source for compensating the weight acting on the component.

2. The weight compensating device according to claim 1, wherein the at least one negative pressure body is configured in the form of a vacuum hose.

3. The weight compensating device according to claim 2, wherein a plurality of vacuum hoses are provided.

4. The weight compensating device according to claim 3, wherein the negative pressure source is connected via an accumulator to the at least one negative pressure body.

5. The weight compensating device according to claim 1, wherein the negative pressure source is connected via an accumulator to the at least one negative pressure body.

6. The weight compensating device according to claim 5, wherein the accumulator is connected via a line of a small cross-section to the at least one negative pressure body.

7. The weight compensating device according to claim 6, wherein the carrier and the component are configured as part of a machine tool, the component including a drive unit.

8. The weight compensating device according to claim 5, wherein the negative pressure source comprises a vacuum pump coupled to a surface of the accumulator.

9. The weight compensating device according to claim 1, wherein the carrier and the component are configured as part of a machine tool, the component including a drive unit.

10. The weight compensating device according to claim 9 wherein the component has a longitudinal axis and forms an axial unit that is movable at least in the vertical direction relative to the carrier.

11. The weight compensating device according to claim 10, wherein the axial unit comprises at least one linear drive.

12. The weight compensating device according to claim 10, wherein at least two of the negative pressure bodies are positioned in a symmetrical arrangement about the component to compensate the weight of the axial unit.

13. The weight compensating device according to claim 9, wherein the component is supported by a portal, which is supported by a machine bed.

14. The weight compensating device according to claim 13, further comprising a table for carrying a workpiece movably arranged on the machine bed.

15. The weight compensating device according to claim 14, wherein the component has a longitudinal axis and forms an axial unit having the spindle and a tool and the table is movable in a substantially horizontal direction relative to the carrier for positioning under the spindle and the tool.

16. The weight compensating device according to claim 14, wherein the component has a longitudinal axis and forms an axial unit with the spindle and a tool that is movable at least in the vertical direction relative to the carrier to position the spindle and tool in a vertical location over the machine bed.

17. The weight compensating device according to claim 13, wherein the portal comprises a symmetrical arrangement for supporting the carrier.

18. The weight compensating device according to claim 9, wherein the component has a longitudinal axis and forms an axial unit that comprises at least one linear drive.

19. The weight compensating device according to claim 1, wherein at least one vacuum hose is fastened to the carrier by at least one connection to introduce a vacuum into the at least one negative pressure body.

* * * * *